E. McKENNEY.
SAW.
APPLICATION FILED JAN. 28, 1919.

1,402,427.

Patented Jan. 3, 1922.

Inventor
Emerson McKenney

By

Attorney

UNITED STATES PATENT OFFICE.

EMERSON McKENNEY, OF PHILADELPHIA, PENNSYLVANIA, ASSIGNOR OF ONE-HALF TO GALEN McKENNEY, OF BANGOR, MAINE.

SAW.

1,402,427. Specification of Letters Patent. Patented Jan. 3, 1922.

Application filed January 28, 1919. Serial No. 273,567.

*To all whom it may concern:*

Be it known that I, EMERSON McKENNEY, a citizen of the United States, residing at Philadelphia, in the county of Philadelphia, State of Pennsylvania, have invented a new and useful Saw, of which the following is a specification.

My invention relates to improvements in saws. The object is to provide a new formation which will secure the minimum of resistance in the cutting operation and still preserve the maximum of strength and rigidity of the cutting teeth.

Referring to the drawings, which illustrate merely by way of example suitable means for the embodiment of my invention:—

Similar numerals refer to similar parts throughout the several views.

Figure 1:
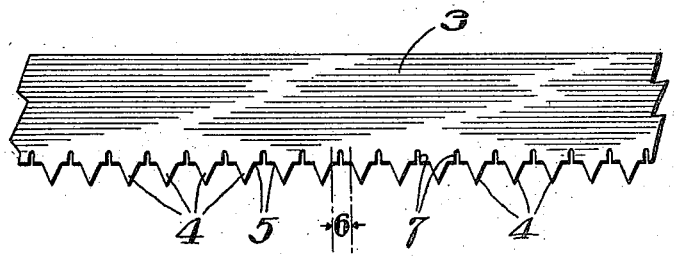
Fig. 1 is a fragmentary elevation of one form of saw blade containing my invention.

The invention is especially adapted to saws made of what is called butcher steel, which is a very thin sheet, adapted for use in tension, as in the buck saw.

In the saw blade 3, made in accordance with my invention, the teeth 4, instead of being continuous, are spaced apart, the bases 5 being separated a distance 6 equal to the dimension of the base of a tooth, and midway between the bases of adjacent teeth is cut a recess or slot 7 for facilitating the discharge of saw dust. The recess or slot 7 extends into the blade a distance less than half the distance between said recesses. The distance between a recess 7 and the base of the adjacent saw tooth is greater than the width of the recess.

The advantage of this structure is that with very thin blades ample provision is made for facilitating the clearance of saw dust and thus presenting the least resistance to the operation of the saw, without unduly impairing the strength and rigidity of the teeth.

Figure 2:
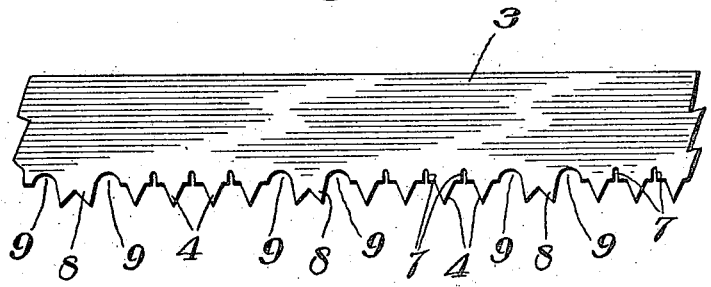
Fig. 2 is a similar view of another form.

In the form shown in Fig. 2, between groups of the saw teeth 4, in the present example four in number, are provided the clearing teeth 8. The recesses 9 between these clearing teeth 8 and adjacent saw teeth 4 are approximately of the same depth as that of recesses 7.

What I claim is:—

1. A saw blade of the character described having teeth spaced apart a distance equal to the width of the tooth at its base and provided with recesses between teeth bases, extending into the blade a distance less than half the distance between said recesses.

2. A saw blade as defined in claim 1, in which the distance between a recess and a saw tooth is substantially greater than the width of the recess.

EMERSON McKENNEY.